United States Patent [19]

Turner

[11] 3,841,759
[45] Oct. 15, 1974

[54] VEHICLE HEADLAMP AIMING SYSTEM AND METHOD

[75] Inventor: Philip L. Turner, Southfield, Mich.
[73] Assignee: Ford Motor Company, Dearborn, Mich.
[22] Filed: Aug. 31, 1973
[21] Appl. No.: 393,699

[52] U.S. Cl. .................................. 356/121, 33/288
[51] Int. Cl. ........................................... G01b 11/26
[58] Field of Search ....... 356/121, 155, 138; 33/288

[56] References Cited
UNITED STATES PATENTS

| | | | |
|---|---|---|---|
| 3,520,618 | 7/1970 | Bentley | 356/121 |
| 3,532,432 | 10/1970 | Mansour | 356/121 |
| 3,666,369 | 5/1972 | Carrigan | 356/121 |

*Primary Examiner*—Ronald L. Wibert
*Assistant Examiner*—Paul K. Godwin
*Attorney, Agent, or Firm*—Robert A. Benziger; Keith L. Zerschling

[57] ABSTRACT

A system is disclosed for accurately evaluating the aiming of vehicle headlamps in relation to the direction of travel of the vehicle. The system is comprised of a platform mechanism which establishes a reference direction and includes means for receiving an automotive vehicle on the platform. The system includes further means to align the direction of travel of the vehicle so as to be parallel to the reference direction. The last mentioned means is comprised of laterally displaceable platforms receiving the nondriving wheels of the vehicle and a wheel abutting mechanism for aligning the axis of the driving wheels or wheel of the vehicle perpendicular to the reference direction. A swingable parallelogram means or apparatus, connected to the platform, includes a housing mechanism for cooperative association with the headlamps of the vehicle to be tested. The swingable apparatus is arranged to maintain the housing parallel the reference direction. The housing mechanism includes a suction means for direct coupling to the headlamps of the vehicle and an extending lever arm mechanism which has a predetermined angular relationship with respect to the reference direction. Preferably this is parallel to the reference direction. The lever arm mechanism is coupled to a pair of linear variable differential transformers (LVDT) which are arranged to electrically measure deviations between the normal position of the lever arms means and the position assumed by that lever arm means when the suction cup mechanism is applied to the headlamp of a motor vehicle. The present invention also contemplates the provision of electrically controlled servo-screwdriver means for automatically adjusting the headlamp aiming as a function of the output of the LVDT's. The present invention also contemplates that the platform mechanism may be made portable.

11 Claims, 9 Drawing Figures

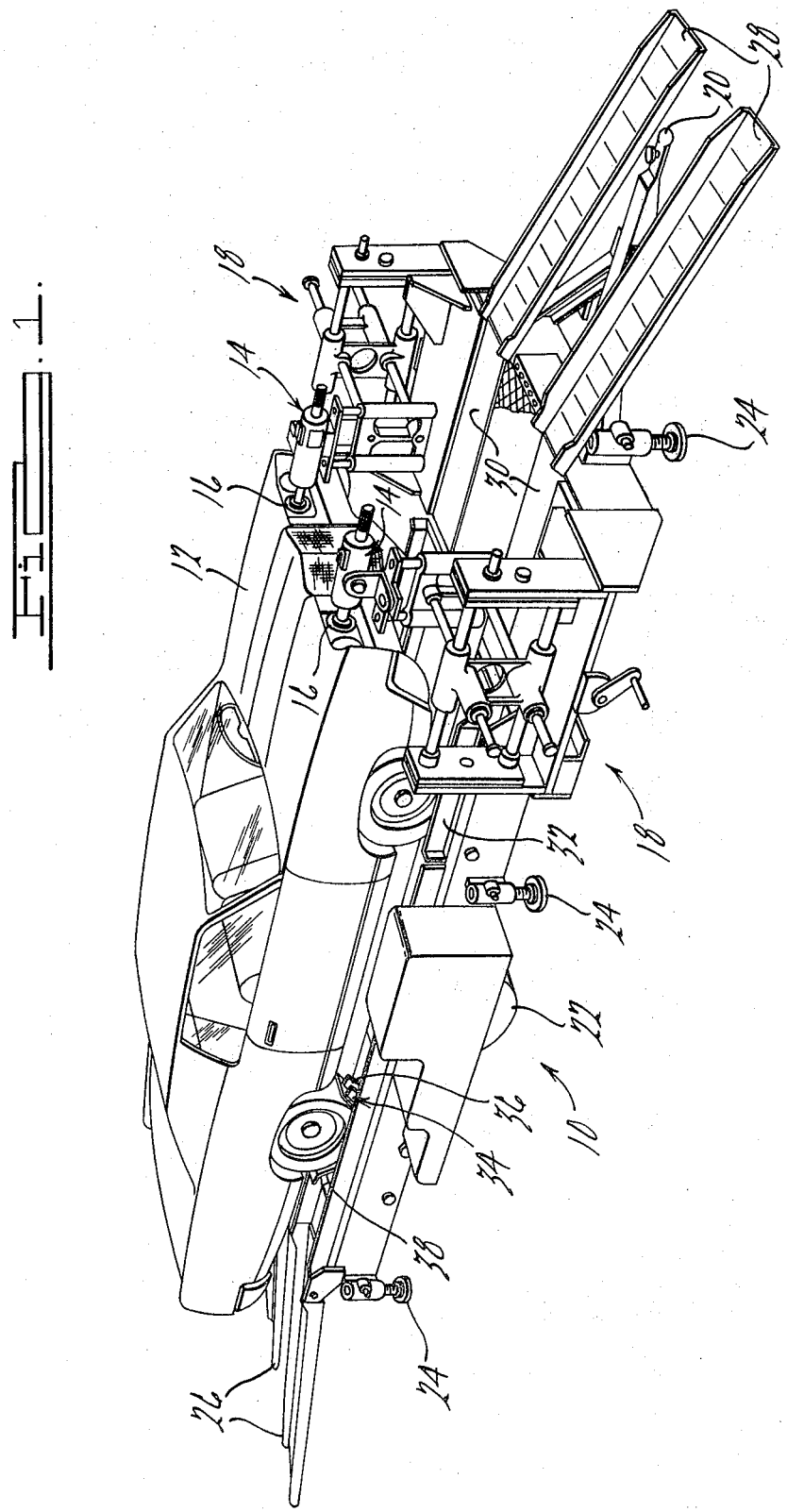

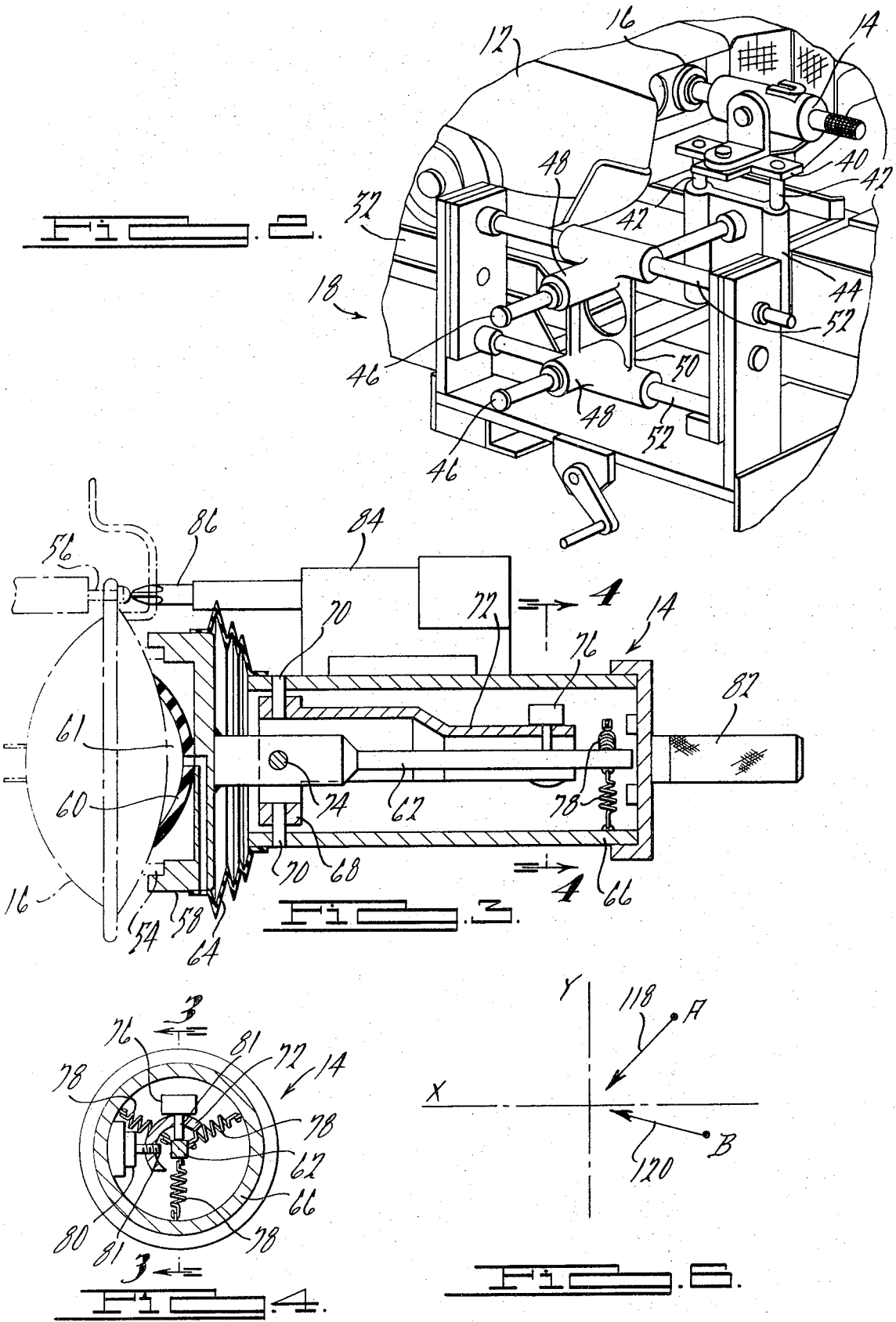

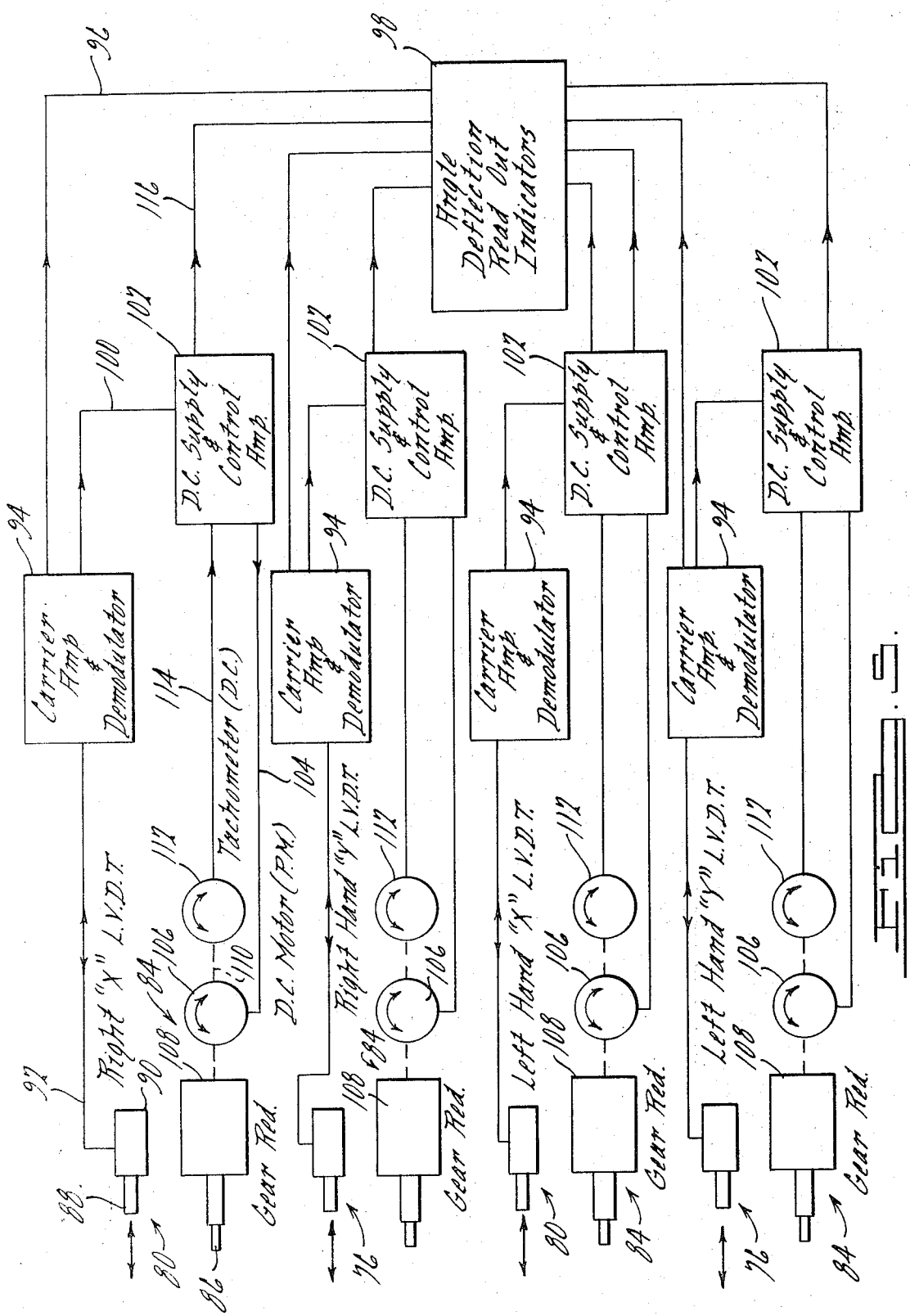

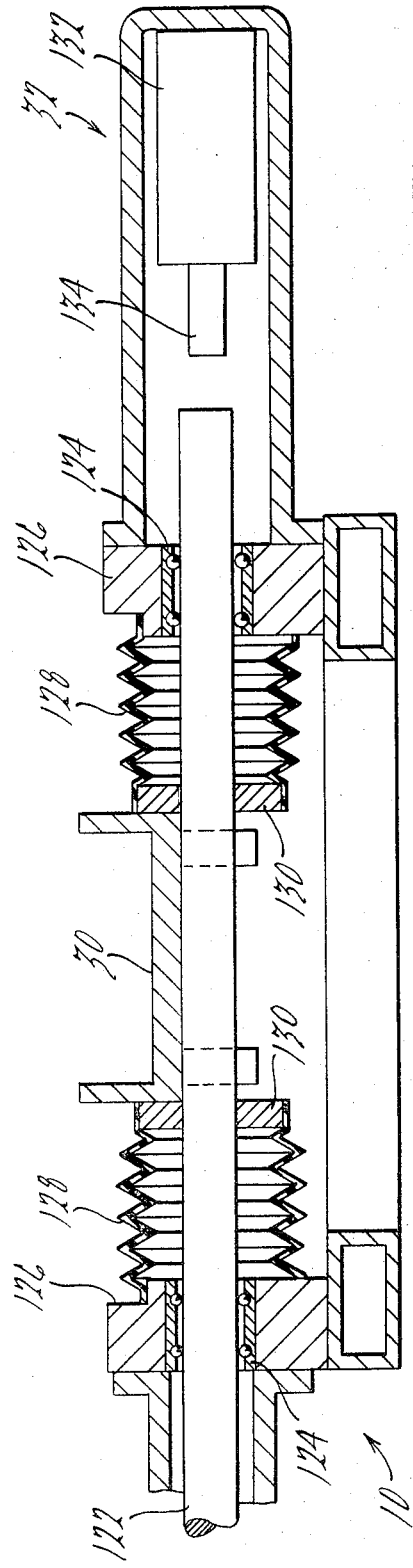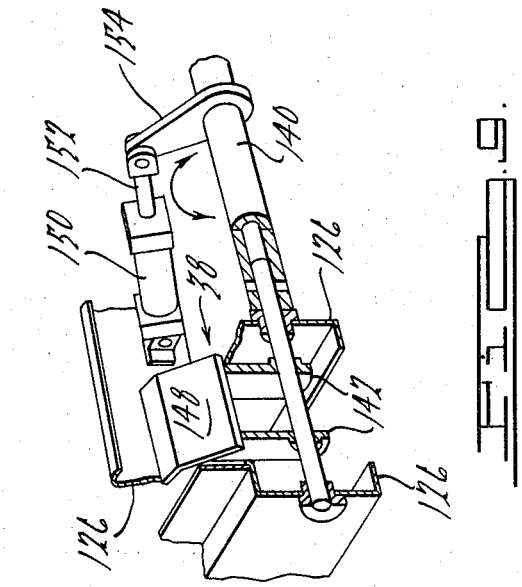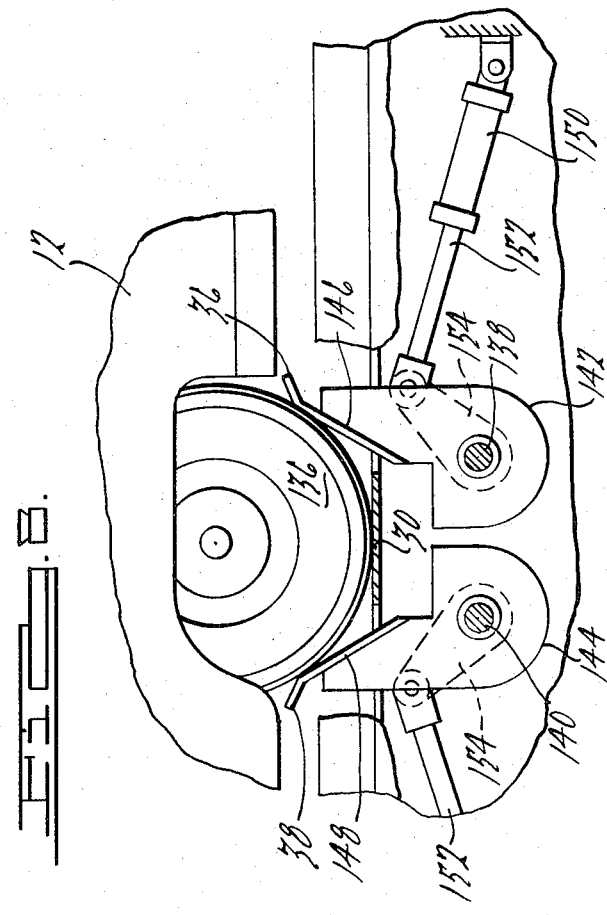

VEHICLE HEADLAMP AIMING SYSTEM AND METHOD

BACKGROUND OF THE INVENTION

1. Field of the Invention

The present invention is related to the field of lamp aiming mechanisms and particular to that portion of the above noted field which is concerned with the aiming of automotive vehicle headlamps. More particularly still, the present invention is directed to a method and an apparatus for quickly and accurately aiming the headlamps as the vehicle comes off the production line and which may also be conveniently used as a safety inspection apparatus in either a permanent or mobile installation.

2. Description of the Prior Art

Three types of headlamp aiming procedures are in use with each procedure utilizing equipment dictated by the procedure. The first procedure is visual examination of a light pattern projected on a target board aiming screen at a required distance of for example 25 feet. The lamps are adjusted by manual or mechanical means to conform to the Society of Automotive Engineers Recommended Practice Lighting Inspection Code-SAE J599b. An alternate means for inspecting the headlamp aim of a vehicle may be with a mechanical headlamp aimer. Typically, this equipment uses a split image lens to set two headlamps parallel to each other. A spirit level, for example, is used to set the vertical position of the headlamp aim pattern. This mechanical headlamp aimer must comply with the code mentioned above and it ordinarily includes devices that rest against the three ground glass aiming pads provided on the headlamp lens face. This system is highly dependent upon the complex interrelationship between the vehicle, the headlamp mounted in the vehicle, the platform upon which the vehicle and the headlamp aiming mechanism rests and the relationship between the headlamp aiming mechanism and the platform.

Automotive vehicle headlamps are ordinarily manufactured with the light beam having a precisely defined direction with respect to the above mentioned three aiming pads. While the above mentioned mechanical aiming mechanisms may reliably define the position of these aiming pads with respect to the mechanism indicators, the large number of additional variables combine to render the present mechanical indicators highly inaccurate as mechanisms for defining the direction of the light beam.

The above noted visual based system is also subject to difficulties. The primary difficulties are due to the variations in the operators interpretation of the position of the edges of the projected light beam on the horizontal and vertical aiming target lines on the screen. Added to this are the inherent problems of operator fatigue, attitude, visual acuity and other human frailties. Furthermore, the edges of the high intensity zone of the projected light beam may vary with respect to the center of that projected light beam from one headlamp to another. A variation of the visual based system described above is discussed in U.S. Pat. No. 3,386,333 issued to B. W. Preston on June 4, 1968, titled "Headlamp Aiming" and assigned to the assignee hereof. This system overcomes many of the above noted human frailties and shortcomings but is also subject to the variations which may exist from one headlamp to another.

A further problem which exists with respect to both of the visual based systems and with the mechanical based systems described above resides in the fact that the presently known and available systems fail to take into account any variations which might exist between the direction of travel, the road attitude, of the vehicle and the alignment of the headlamp holder with respect to that direction of travel. While it is intended that the headlamp holder will be positioned in a plane perpendicular to the direction of travel of the vehicle, normal manufacturing tolerances permit significant angular variations to exist. These systems also require substantial set-up time and substantial space devoted to their use.

It is therefore apparent that a need exists for a new system for aiming headlamps which will eliminate or minimize the variations described above and that will eliminate or substantially reduce the disadvantages that are inherent in both the visual and mechanical based systems. It is, therefore, an object of the present invention to provide a system for accurately and reliably determining the aiming of the headlamps of an automotive vehicle. It is a further object of the present invention to provide a system which combines the repeatable accuracy of the mechanical system with the directional accuracy and automatic adjustment capability of the electrical operated visual system. More particularly, it is an object of the present invention to provide a system for determining the aiming of the headlamp of a motor vehicle which mechanically determines the direction of aiming with respect to a fixed reference and which electrically evaluates the difference therebetween. In order to provide a system which takes into account the possibility for variation between the direction of travel of the vehicle and the direction of alignment of the body of the vehicle is a further object of the present invention to provide a system which mechanically determines the direction of aiming of the headlamps with respect to a reference direction which coincides with tHe direction of travel of the vehicle and which thereafter electrically evaluates deviations therebetween. It is also an object of the present invention to provide a system which may be used to adjust the aiming of the headlamps in response to deviations evaluated in accordance with the previously expressed objects.

SUMMARY OF THE PRESENT INVENTION

The present invention provides a system which establishes a reference direction and which is arranged to automatically align the automotive vehicle so that its direction of travel is parallel to the reference direction. Housing means are arranged to be mechanically coupled to the headlamps of the vehicle and electrical means are provided to measure any angular deviation which may exist between the direction of the centerline of the headlamps and the reference direction. The housing means are arranged to be movable in space to accommodate the wide variety of vehicle sizes and headlight heights encountered in normal practice while maintaining a predetermined angular relationship with the reference direction. The electrical means include, by way of example, linear variable differential transformers (LVDT's), for measuring distances which readily convert into angular deflection values, for generating a usable electrical signal for measurement of any deviation and for controlling servo-screwdrivers to adjust the aim.

BRIEF DESCRIPTION OF THE DRAWING

FIG. 1 illustrates in a perspective view one embodiment of a vehicle headlamp aiming apparatus according to the present invention.

FIG. 2 illustrates in an enlarged view a portion of the apparatus of FIG. 1.

FIG. 3 illustrates a sectional view of the electromechanical headlamp aim evaluating apparatus according to the present invention.

FIG. 4 illustrates a sectional view taken along section line 4—4 of the apparatus of FIG. 3.

FIG. 5 illustrates in a blocked diagram the informational processing electronics according to the present invention.

FIG. 6 shows a graph illustrative of the operation of the present invention.

FIG. 7 shows a sectional view of laterally displaceable table apparatus according to FIG. 1.

FIG. 8 illustrates in a partial view the drive axle aligning apparatus according to FIG. 1.

FIG. 9 shows a partially broken away perspective view of a portion of the drive axle aligning apparatus according to FIG. 1.

DETAILED DESCRIPTION OF THE PREFERRED EMBODIMENT

Referring now to the drawing wherein like numbers designate like structure throughout the various views, FIG. 1 illustrates the headlamp aiming apparatus according to the present invention in association with a portable trailer apparatus generally designated as 10. An illustrative automotive vehicle 12 is shown positioned on the trailer such that the electromechanical headlamp aim evaluating devices 14 are shown in cooperative association with headlamps 16, for example the inboard or high beam headlamps. The electromechanical means 14 are mounted on swingable parallelogram means 18 so as to be movable in any one or combination of three directions while maintaining the angular relationship of the aim evaluating devices 14 constant.

The trailering apparatus 10 is provided with a trailer hitch 20 and wheels 22 so as to be readily portable and is further provided with a plurality of load supporting stabilizers 24. Trailering apparatus 10 is also provided with on-loading ramps 26 and off-loading ramps 28. It will be appreciated that the present invention is shown in cooperation with a trailing apparatus merely for purposes of illustration and that a stationary or permanent installation for the apparatus of the present invention is also contemplated.

The apparatus according to the present invention is also provided with a pair of roadbed means 30 which are arranged to receive the wheels of a vehicle 12 to be tested. Roadbed means 30 are arranged to be sized and spaced so as to accommodate the largest majority of road traveling vehicles from the small sub-compact sized automobile to the largest four wheeled truck vehicle. It will be appreciated that a permanent installation could be arranged to accommodate selected sizes of vehicles or could alternatively be sized to accommodate all sizes of road traveling vehicles. Roadbed means 30 are provided with means 32 for permitting lateral displacement of each of the nondriving wheels of the vehicle 12. By lateral displacement is means displacement to the left or to the right of the roadbed means 30.

Roadbed means 30 are also provided with means 34 for aligning the driving wheel or wheels of the vehicle in a direction which is substantially parallel to a reference direction. It will thus be seen that lateral displacement constitutes displacement substantially perpendicularly to the reference direction.

Lateral displacement means 32 and parallel alignment means 34 are mutually cooperative to align the direction of travel of the vehicle substantially parallel with the reference direction. These means cooperate as follows. The vehicle is driven onto the roadbed means 30 until the driving wheels, in the usual case one of the rear wheels, come into contact with upwardly positioned forward abutment plate or member 36. The spacing between lateral displacement means 32 and parallel alignment means 34 is arranged to accommodate the largest majority of wheel-base dimensions. This will cause the nondriving, usually the front, wheels to be situated upon lateral displacement means 32. With the vehicle engine nonoperative and the vehicle transmission in a neutral setting the left and right hand rear abutment plates or members 38 will be forced upwardly and forwardly under suitable pressure to cause both rear wheels of the vehicle to contact the forward abutment members 36. This will place the driving wheels of the vehicle, and hence its normal direction of travel, in a direction which is parallel to the reference direction established by the roadbed means 30. In order to accommodate this alignment, the lateral displacement means 32 are arranged to permit the nondriving wheels and hence the chassis and body of the vehicle 12 to be displaced leftward or rightward to permit both driving wheels of the vehicle to abut the forward abutment members 36. Use of separate forward and rear abutment members permits accommodation of any conceivable wheel diameter without effecting the road attitude of the vehicle 12.

Referring now to FIG. 2, the swingable parallelogram apparatus 18 is illustrated in an enlarged partial view of the apparatus illustrated in FIG. 1. Aim evaluating means 14 are attached to a base plate 40 which is arranged to lie in a plane parallel to the reference direction. The term "parallelogram apparatus" is intended to cover any mechanism which is capable of moving a base plate to a large number of positions such that the base plate will include at least a portion which is parallel to a selected direction in all possible positions of the base plate. As such, the following description is intended to be illustrative and not definitive. Furthermore, the selected direction need not be the reference direction although this is the presently preferred relationship. Base plate 40 is arranged to be moved vertically on a pair of vertical travel rods 42. The vertical travel rods 42 are reciprocally received within vertical bosses of laterally displaceable plate 44 which is mounted at the end of a pair of lateral travel rods 46. The lateral travel rods 46 are reciprocally received within lateral travel bosses 48 of parallel travel plate 50. Parallel travel plate 50 is slidingly received on stationary pair of parallel travel rods 52. Travel rods 52 are mounted so that their axes are parallel to the reference direction while travel rods 46 and 42 are mounted so their axes are mutually perpendicular and perpendicular to the reference direction. While FIG. 2 illustrates one form of the known parallelogram mechanism, other forms are notoriously well known and are suitable in the practice of the present invention provided they are arranged to maintain the electromechanical headlamp aim evaluating means 14 at a predetermined and constant angular relation with respect to the reference direction.

Following placement of vehicle 12 upon the roadbed means 30 such that the driving wheels are biased into abutment with the forward abutment plates 36 and the vehicle has assumed a position of rest such that it is in a road attitude with its direction of travel substantially parallel to the reference direction, the operator can then position electromechanical means 14 by means of the mutually sliding perpendicular travel rods and plates such that electromechanical means 14 are immediately forward of, and in contact with, the headlamp 16 whose aim is to be evaluated. It can readily be seen from FIGS. 1 and 2 that parallelogram mechanism for moving aim evaluating means 14 over a large number of potential headlamp positions while accurately positioning the aim evaulating means with respect to the reference direction.

Referring now to FIG. 3, the electromechanical aim evaluating means 14 is illustrated, in a sectional view, in cooperative association with a headlamp 16 of an automobile. Automotive vehicle headlamps, whether they are of the five inch or seven inch diameter variety, are provided with a plurality of ground glass loacting lugs 54. These lugs 54 are arranged to define a reference plane when the headlamp has been properly installed in the headlamp frame of an automotive vehicle. This frame is resiliently biased by means, not shown, against a pair of adjustable screws 56 so that the angular relationship of the plane of the frame may be controllably adjusted to a semi-permanent position. Electromechanical means 14 are provided with a locating frame or member 58 which is contoured to align with the ground glass locating lugs 54. Internally thereof, there is located suction cup member 60 which may be compressed in a well known manner against the lens portion of the headlamp 16 so as to create a partial vacuum in the region identified by the numeral 61. This partial vacuum will be operative to maintain locating frame 58 in abuting position with ground glass lugs 54. Electromechanical means 14 are further provided with a lever arm member 62 which is fixedly attached to locating frame 58 and is operative to define the plane determined by the three ground glass locating lugs 54 by establishing a direction having a known angular relationship therewith. As illustrated, lever arm 62 is arranged to define a direction perpendicular to this plane. Flexible bellows member 64 is connected to the locating frame 58 and to the housing portion 66 as a dust cover or shield.

Gimbal ring 68 is supported in the interior of housing portion 66 by a pair of coaxial pivot members 70. Gimbal ring 68 further includes lever arm 72 which is fixedly connected thereto and which extends rightward (relative to FIG. 3). Gimbal ring 68 is constrained to rotate about the axis of the pivots 70 so that lever arm 72 can move in only one plane, for example the Y plane. Lever arm 62 passes through the center of gimbal ring 68 and is connected thereto by pivot member 74 such that the axis of pivot member 74 is perpendicular to, and intersects, the axis of the coaxial pivot members 70. The pivot members 70, 74 may be, for example, as illustrated in U.S. Pat. No. 3,073,584 issued to H. Troeger titled "Flexural Pivot Device" and assigned to The Bendix Corporation.

Housing portion 66 is thus operative to support the locating frame 58 and the lever arm member 62 through the cooperation of the gimbal ring 68 and the pivot members 70, 72. Furthermore, while lever arm 62 is free to assume any angular position with respect to the reference direction, the lever arm 62 is constrained to move in only a single plane, for example the Y plane, with respect to the gimbal ring 68. As illustrated in this view, the lever arms 62 and 72 are arranged to extend in generally parallel side-by-side relationship and are connected at their remote ends by linear variable differential transformer (LVDT) 76. An exemplary linear variable differential transformer (LVDT) is described in Notes on Linear Variable Differential Transformers, published by Schaevity Engineering, Bulletin AA-1a.

With reference now to FIGS. 3 and 4, it can be seen that the remote end of lever arm 62 is connected to the housing portion 66 by a plurality of resilient spring members 78. These spring members 78 are operative to establish a bias on lever arm 62 to thereby define or establish a null or proper alignment signal position. As illustrated in these figures, springs 78 are fixedly attached to the housing portion 66 and to the lever arm 62. It will be appreciated that in practice at least two of the springs 78 should be connected to housing portion 66 through an adjustable connection to compensate for any deterioration or variation between the spring constants. In practice, the swingable paraellelogram apparatus or any other convenient portion of the means forming the test platform or apparatus could be provided with a fixed reference headlamp lens or replica so aligned that the aim evaluating means could be positioned adjacent thereto and the tension in springs 78 adjusted until the measured deviation were as close to zero as possible.

AS particularly illustrated in FIG. 4, lever arm 72 is provided with a cross-sectional configuration such that portions of the lever arm 72 are positioned opposite the lever arm 62 over at least a 90° segment of the lever arm 62. As here illustrated, lever arm 72 is provided with a cross-section having 90° of a cylinder. Rectangular and other configurations are contemplated. A second linear variable differential transformer (LVDT) 80 is connected on one side to the housing portion 66 and on the other side to lever arm 74. It can be seen from these figures that LVDT 76 is connected to be vertical with reference to the reference direction while LVDT 80 is connected to be horizontal with respect to the reference direction. As is known in the electrical art, an LVDT is provided with a movable ferromagnetic core such as at 88, whose position between a set, typically three, of conductive coils within the housing 90, defines the electromagnetic coupling therebetween such that an output signal derived from the LVDT will vary in a linear manner with respect to variations in core positioning. Thus, it can be seen that assuming the LVDT output to be nulled or zero when lever arm 62 is parallel to the direction of travel of the vehicle, the magnitude and polarity of the signal derived from LVDT 76 will be a measure of the deviation of headlamp aim in the vertical plane while the magnitude and polarity of the output signal derived from LVDT 80 will be indicative of the deviation of headlamp aim in the horizontal plane. Since lever arm 62 is free to move in two planes relative to the housing portion 66 while lever arm 72 is free to move in only one plane relative to the housing portion 66 it can be seen that a transducer interconnecting lever arm 62 and lever arm 72 generally perpendicularly to the plane of movement of lever arm 72 will measure movement of the lever arm 62 only in that plane. Additionally, a transducer interconnecting lever arm 72 and housing portion 66 in the plane of movement of lever arm 72 will measure movement of lever arm 72 in that plane and hence of lever arm 62 in that plane. Thus the movement of lever arm 62 can be readily converted to rectangular coordinates generally corresponding to the conventionally provided adjustment mechanisms. Furthermore, through the use of transducer measuring distance and the Pythagorean relationship, angular deviations are readily measured. It will be appreciated that other transducers and methods of calculation may be used along with other gimbal mechanisms without departing from my invention.

Referring again to FIG. 3, it can be seen that electromechanical aim evaluating device 14 may be further provided with means defining a positioning handle 82 such that the gross position of the electromechanical means 14 with respect to any one headlamp 16 can be readily and conveniently varied. Electromechanical means 14 are also here illustrated as including headlamp aim adjusting means in the form of servo-screwdriver having a rotatable screwdriver blade 86 positioned to be aligned with adjustment screw 56. The cooperation of the servo-screwdriver with respect to the adjustable screw 56 and electromechanical means 14 is described hereinbelow with reference to FIG. 5.

Referring now to FIG. 5, a block diagram illustrating the electrical operation of the control portion of the present invention is shown. Inasmuch as the FIG. 1 embodiment illustrates a pair of headlamp aiming devices designated 14 and FIG. 3 illustrates a headlamp aim adjusting means 84 in association with a headlamp aim evaluating device 14, the FIG. 5 embodiment illustrates the electrical signal processing utilizing two linear variable differential transformers for each of the two illustrated headlamp aim evaluating devices 14 and four headlamp adjusting means 84. Since the operation of any one linear variable differential transformer (LVDT) and any one headlamp aim adjusting mechanism 84 would be the same regardless of its location with respect to the vehicle 12, a single operating loop will be described. The right hand X coordinate (or horizontal) linear variable differential transformer (LVDT) 80, that is the LVDT sensitive to angular deflection of the (vehicle) right side headlamp in the horizontal plane, includes a movable, electromagnetically permeable core element 88. Core element 88 is movable with respect to a housing portion 90 which is fixedly attached to housing portion 66 (in the exemplary operating loop) of the headlamp aim evaluating means 14 as illustrated in FIG. 5. Housing portion 90 receives electrical energy over suitable conductors within cable means 92, which energy is operative to energize an electromagnetic coil or inductance in the known manner. The voltage potential which appears on other suitable conductors for example also within cable means 92 and the polarity thereof will be a function of the voltage applied to housing portion 90 and the positon of movable core 88 within housing 90. This voltage and hence the position of core 88 within housing 90 is sensed by the carrier amplifier and demodulator 94. Amplifier and demodulator 94 generates an output signal voltage which is directly related to the position of movable core 88 within housing portion 90 and applies this voltage over cable means 96 to the angle deflection readout indicator means 98. Angle deflection readout indicator means 98 may preferably comprise a plurality, on a one-to-one basis with the number of LVDT's of voltmeters having a centered null position and deflectable left and right to indicate angular alignment on one side or the other side of a centered or null position. The voltmeters may be calibrated in degrees of deflection to provide a direct readout.

Carrier amplifier and demodulator 94 is also operative to generate a voltage signal on cable means 100 which is directly analogous to the signal appearing on cable means 96 and this signal is applied to the DC supply and control amplifier 102. DC supply and control amplifier 102 is operative to generate an output signal on cable means 104 having a magnitude and polarity directly related to the magnitude and polarity of the signal appearing on cable means 100. This voltage may be applied to a DC motor 106, for example a permanent magnet motor, of the angle deflection correcting means 84. Motor 106 may for example drive, through a suitable gear reduction means 108, a screwdriver blade 86 such as illustrated in FIG. 3 to effectuate headlamp air correction. During the process of this correction, the angular position of movable core 88 within housing portion 90 will move toward the null position reducing the deflection indicating signal appearing on the conductors within cable means 92 and hence the magnitude of the signal applied over cable means 96 and 100. As the signal on cable means 96 approaches a zero or null value, the angular deflection readout indicator means associated with that conductor will indicate a decreasing amount of angular deflection for the associated headlamp. Concomitantly, the amount of signal applied to the DC supply and control amplifier 102 will be reduced so that the energizing signal applied to motor 106 will be reduced. This reduction of signal will be operative to cause motor 106 to operate with increasing slowness so that the speed of rotation of screwdriver blade 86 will be reduced. As the movable core 88 approaches its null position, this will have the effect of slowing the rate of correction such that over-shoot of the correct position can be minimized. Greater accuracy and hence less over-shoot can also be accomplished by communicating motor 106 over conductor 110 to tachometer 112 which may thereafter generate an electrical feedback signal on conductor 114 for application to the DC supply and control amplifier 102. The output of DC supply and control amplifier 102 may also be provided over conductor 116 to the angle deflection readout indicator to verify the accuracy of the correction and the presence of a correction signal. In order to provide highly accurate establishment of the null position for the LVDT's, an off-set voltage may be applied to the sensing coils of the LVDT's or to the associated carrier amplifier and demodulator 94. It will be appreciated that the circuitry disclosed is intended to be exemplary rather than definitive and that a large number of variations therein may be made. For example, the various components may serve more than one LVDT and some components may be eliminated where cost considerations are critical or automated correction is not desired.

Referring now to FIG. 6, the operation of the present invention will be described with reference to the orthogonal coordinates illustrated in FIG. 6 and denoted by the axis designations X and Y. The intersection of the axes indicates the null position wherein the associated headlamp 16 is accurately aimed. Deviation of proper aiming from the null position will result in lever arm 62 of headlamp aim detection mechanism 14 assuming a position which may be defined in X and Y coordinates and which may lie in any one of the four quadrants. Assume firstly that the lever arm 62 of headlamp aim evaluating means 14 has been deflected to the point denoted as A (in the first quadrant). This will result in signals being applied to the angle deflection readout indicator means by the associated X coordinate LVDT and the associated Y coordinate LVDT and associated components which have voltage polarities which may be considered to be positive. The magnitude of these voltages will be directly related to the distance with which the point A is located from the X coordinate and from the Y coordinate. For example, the angular deflection may be measured in volts with the relationship that one-half volt of signal corresponds to 5° of angular deflection. Thus, if the associated headlamp were aimed 10° to one side and 10° too high, the voltage meters of the angle deflection readout indicator means 98 would indicate + one (1) volt which would directly be translated for example through calibration of the instrument face to read 10° in each case. In those instances where headlight aim adjusting mechanism 84 are directly connected to the headlamp aim evaluating means 14 these signals may for example result in a motor speed of 1000 rpm for each volt of deviation from the null position such that a motor speed at motor 106 of 1000 rpm would be observed. Through proper gear reduction this could result in rotation of the screwdriver tips 86 at for example 20 revolutions per minute. Simultaneous operation of the associated motors 106 would be operative to cause the lever arm 62 to approach the null position following the path described by arrow 118.

As a second example, the aim of the headlamp 16 may be for example such that the lever arm 62 of the associated headlamp aim evaluating means 14 assumes the position indicated by the letter B on FIG. 6. The DC supply and control amplifier 102 associated with the X coordinate LVDT 80 will generate a signal having a positive polarity and a magnitude indicative of a relatively large excursion from the null point in the X plane of for example one and one-half (1 ½) volts. On the other hand, the DC supply and control amplifier 102 associated with the Y coordinate LVDT 76 will generate an output signal having a negative polarity and a relatively small magnitude indicating a relatively small excursion from the null position in the Y plane. This signal magnitude would be for example about one-half volt. These signals would be operative to cause the motors 106 associated with the X and Y coordinate LVDT's to operate in rotational directions and at speeds sufficient to cause the lever arm 62 to approach the null position following arrow 120. This assumes of course that the motors are operating substantially in unison. Conversely, sequential operation could be employed such that the deviation with respect to a first axis, for example the X axis is first connected for and subsequently connection with respect to the second, for example the Y axis is then applied.

Referring now to FIG. 7, a portion of an illustrative floating platform lateral displacement means 32 is illustrated. A portion of roadbed means 30 is supported by slidable means illustrated for example by rod 122 which is received in a plurality or roller bearings 124. Roller bearings 124 are received in the frame 126 which may be for example a permanent installation or a portion of trailer 10. Bearings 124 are operative to permit leftward and rightward movement of the included portion of the roadbed means 30 with respect to the frame 126. This permits the nondriving wheels of the vehicle being tested to be displaced leftward or rightward in response to alignment of the driving wheels of the vehicle in a direction substantially parallel to the first or reference direction. Thus, a vehicle 12 may be positioned with respect to the test apparatus so that any deviation in alignment of the frame of the vehicle from the first or reference direction may be readily compensated for in establishing or evaluating the headlamp aim. In order to keep the roller bearings 124 in a relatively clean and dirt-free environment, bellows or diaphragms 128 may be connected on their one end to a plate member 130 which is fixedly connected to the rod 122 and on the other end to the frame 126. Solenoids 132 (only one shown), having linearly displaceable plungers 134 are operative when energized to align the laterally displaceable portion of roadbed 30 with the off-loading ramps 28 and to maintain a selected lateral position of the included portions of the roadbed means 30 for the safe off-loading of the vehicle. It will be appreciated that two or more rods 122 may be required for proper weight distribution. The lateral displacement means 32 could also be air floated tables or any other low friction device.

Referring now to FIGS. 8 and 9, an exemplary drive wheel alignment mechanism for use in the present invention is illustrated in FIG. 8 in a fragmentary, elevational view, partly broken away and taken from FIG. 1, and in FIG. 9 in a partly sectional, partly broken away perspective view. The driving wheel 136 of the vehicle 12 has its rightward, relative to FIG. 8, position established by the upwardly extending forward abutment member 36 while the rearward abutment member 38 is in a retracted position wherein it constitutes a portion of the roadbed 30. Upon rotation of abutment member 38 in a clockwise, relative to FIG. 8, direction contact with the driving wheel 136 will occur and the driving wheel will be urged into abutment with the forward abutment member 36. Each of the abutment members 36, 38 is mounted for rotation on a shaft 138, 140 with the shafts being rotatably received within the frame 126 of the assembly. Each abutment 36, 38 is provided with a rotating flange portion 142, 144. Each flange terminates in a transverse portion 146, 148. Each of the transverse portions 146, 148 provides, when rotated to the upstanding position, an abutment surface and, when rotated in the downward position, a portion of the roadbed. Rotation for each of the abutment members 36, 38 is provided by, for example, hydraulically actuated cylinders 150 and extending piston rods 152 which are positionable in response to the presence or absence of fluid pressure within cylinders 150. Rods 152 are connected to and operative to rotate the shafts 138, 140 through a linkage mechanism 154. The remote end of the actuating mechanisms comprising cylinders 150 and piston rods 152 is fixedly attached to a further portion of the frame 126 to provide a firm anchor for the mechanism. This mechanism could also be electrically powered as well as manually powered and the embodiment illustrated is for purposes of illustration and is not considered definitive.

It can be seen that the vehicle 12 is received upon the roadbed means 30 such that a road attitude is automatically assumed whereby the headlamp aim can be established or measured with reference to the road attitude and direction of travel of the vehicle rather than with reference to some hypothetical direction which assumes that the vehicle has been (a) manufactured with no tolerance variations and (b) not involved in an accident which might have substantially altered its frame or chassis alignment. By establishing a roadbed surface upon which the vehicle rests the vehicle is sure to be in a road attitude position and by forcing the driving wheels into abutment with an established reference point the direction of travel of the vehicle is aligned to be parallel to an established reference direction. By mounting the headlamp aiming mechanism on a parallelogram mechanism which is readily movable while maintaining a predetermined relationship to the reference direction a large variety of vehicles having various headlamp positions with respect to the roadbed and with respect to each other may be tested. Furthermore, the apparatus disclosed and described hereinabove provides accurate and repeatable results when a large number of vehicles have been processed by the equipment. The present apparatus makes use of the fact that headlamps are normally manufactured having established electrical and optical characteristics with respect to the lens and particularly with respect to the ground glass locating lugs situated around the perimeter of the lens. While the prior art systems have attempted to evaluate light intensity resulting from a projected light spot or pattern, the present invention relies solely on mechanical relationships which are accurately electrically measured rather than upon optical or electrical evaluation of a projected light spot which may be susceptible to significant degrees of variation depending upon the manufacturing tolerances for that headlamp and in particular depending upon the acuity of an operator and the accuracy of placement of the test apparatus. Furthermore, the present invention provides mechanism which may be readily trailerable to provide a service test facility or a safety test facility and does not require a significant degree of training in order to provide trained operators.

I claim:

1. A system for determining the alignment of a motor vehicle headlamp comprising:
   platform means defining at least one surface for receiving the load bearing wheels of a vehicle to be tested;
   direction establishing means in cooperative association with said surface operative to align the driving wheels of the vehicle parallel to a first direction;
   laterally displaceable means in cooperative association with said surface and spaced apart from said direction establishing means for receiving the non-driving wheels of the vehicle, movable perpendicularly to the first direction in response to alignment of the driving wheels parallel to the first direction whereby the vehicle chassis will be aligned with the direction of travel of the vehicle parallel to the first direction;
   at least one movable arm means coupled to said platform;
   at least one support means coupled to said arm means and defining a line having a selected angular relationship with the first direction, said arm means movable to move said support means to a large number of potential positions representing possible headlamp locations while maintaining said support means defined line at the selected angular relationship with the first direction; and
   electromechanical aim evaluating means mounted on said support means having an axis arranged at a predetermined angle with respect to the first direction, coupleable to a vehicle headlamp, and operable when so coupled to generate an electrical signal indicative of the headlamp alignment with respect to the first direction.

2. The apparatus of claim 1 wherein said platform means further include trailering means for rendering said platform means portable.

3. The apparatus of claim 1 wherein said electromechanical means comprise:
   housing means attached to said support means for motion therewith;
   locator means deflectably carried by said housing means and including at least one lever arm member;
   gripping means attached to said locator means operative to grip the exterior lens surface of a headlamp and when so gripping to angularly deflect said locator means beam member to a position indicative of the axis of a light beam emitted by the gripped headlamp; and
   deflection measuring means responsive to the deviation between the light beam axis indicative position and a null position operative to generate an output signal indicative of the alignment of the axis with respect to said first direction whereby headlamp alignment may be determined.

4. The apparatus of claim 3 including further:
   electrical means for receiving said measuring means output signal operative to generate a signal which is a direct function of the angular alignment of the headlamp with respect to said first direction.

5. The apparatus of claim 4 including further:
   indicator means for receiving said electrical means signal for measuring headlamp alignment.

6. The apparatus of claim 4 including further:
   readout means responsive to said electrical means signal operative to directly indicate headlamp alignment with respect to a predetermined standard.

7. The apparatus of claim 4 including further:
   adjustment means operatively associated with said support means, electrically connected to said electrical means and engagable with the headlamp aiming screws for automatically adjusting the alignment of the headlamp.

8. The apparatus of claim 7 wherein said adjustment means comprise:
   electrically driven screwdriver means for engaging the aiming screws; and
   servomotor means receiving said electrical means signal and driving said screwdriver means, the rate of drive being dependent upon and proportional to the magnitude of the alignment deviation.

9. In a system for measuring the alignment of the headlamps of an automotive vehicle, electromechanical headlamp aim direction determining means comprising:
- housing means;
- support means for supporting the housing means, said support means movable to a plurality of positions while maintaining the housing means at a predetermined orientation with respect to a reference direction;
- frame means deflectably coupled to the housing means;
- first and second lever arm members coupled to the frame means for movement therewith, the first lever arm member being fixedly attached to the frame means;
- headlamp gripping means coupled to the frame means for gripping the exterior surface of a headlamp lens and operative when so gripping to deflect the frame means whereby the first lever arm member will assume a position indicative of the axis of a light beam projected by the gripped headlamp;
- means for biasing the lever arm means to a null position;
- first electrical deflection measuring means interconnecting the first lever arm member and the second lever arm member for measuring the deflection of the first lever arm member from the null position in a first plane;
- means for electrically energizing said first electrical deflection measuring means; and
- second means for measuring the deflection of the first lever arm member from the null position in a second plane perpendicular to the first plane.

10. The aim deflection measuring means of claim 9 wherein the second lever arm member is pivotally connected to the housing means for pivoting about a first axis perpendicular to the first plane and extends in side-by-side relationship with the first lever arm member and the second means for measuring comprise:
- second electrical deflection measuring means energizable by the energizing means interconnecting the second lever arm member and the housing means, remote from the pivot connection between the second lever arm member and the housing member for measuring the deflection of the first lever arm member from the null position in a second plane which lies perpendicular to the first plane.

11. The method of evaluating the aim of a headlamp of an automotive vehicle comprising the steps of:
- placing the vehicle upon a platform having wheel receiving roadbeds with the headlamps of the vehicle in proximity to an aim evaluating apparatus, the platform establishing a reference direction;
- biasing the driving wheels of the vehicle while permitting lateral displacement of the nondriving wheel of the vehicle to establish the direction of travel of the vehicle parallel to the reference direction;
- coupling electromechanical aim evaluating means to the lens of a headlamp to determine the axis of a light beam generated by the headlamp; and
- measuring the angular relation between the light beam axis and the reference direction.

* * * * *